US012019503B2

(12) United States Patent
Gim et al.

(10) Patent No.: US 12,019,503 B2
(45) Date of Patent: Jun. 25, 2024

(54) SYSTEMS AND METHODS FOR EXPANDABLE MEMORY ERROR HANDLING

(71) Applicant: Samsung Electronics Co., Ltd., Suwon-si (KR)

(72) Inventors: Jongmin Gim, Milpitas, CA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/845,679

(22) Filed: Jun. 21, 2022

(65) Prior Publication Data

US 2023/0401120 A1    Dec. 14, 2023

Related U.S. Application Data

(60) Provisional application No. 63/343,410, filed on May 18, 2022.

(51) Int. Cl.
G06F 11/07    (2006.01)

(52) U.S. Cl.
CPC ........ *G06F 11/0787* (2013.01); *G06F 11/073* (2013.01)

(58) Field of Classification Search
CPC ............................ G06F 11/073; G06F 11/0787
See application file for complete search history.

(56) References Cited

U.S. PATENT DOCUMENTS

| 7,313,717 | B2 | 12/2007 | Vecoven et al. |
| 7,853,825 | B2 | 12/2010 | Varadarajan et al. |
| 8,201,024 | B2 * | 6/2012 | Burger ............... G06F 11/073 714/6.13 |
| 8,407,515 | B2 | 3/2013 | Heyrman et al. |
| 8,407,516 | B2 | 3/2013 | Swanson et al. |

(Continued)

FOREIGN PATENT DOCUMENTS

WO    WO 2020/189617 A1    9/2020

OTHER PUBLICATIONS

Du, Xiaoming, et al., "Fault-Aware Prediction-Guided Page Offlining for Uncorrectable Memory Error Prevention," IEEE 39th International Conference on Computer Design (ICCD), 2021, pp. 456-463.

(Continued)

*Primary Examiner* — Joseph R Kudirka
(74) *Attorney, Agent, or Firm* — Lewis Roca Rothgerber Christie LLP

(57) ABSTRACT

A system for handling faulty pages includes: a host processor; host memory connected to the host processor over a first memory interface; and an expandable memory pool connected to the host processor over a second memory interface different from the first memory interface. The host memory includes instructions that, when executed by the host processor, cause the host processor to: detect an error in a target page of a first memory device of the expandable memory pool; generate an interrupt in response to detecting the error; store in a faulty page log, faulty page information corresponding to the target page of the first memory device; and change a status of the target page of the first memory device from a first state to a second state according to the faulty page log.

20 Claims, 8 Drawing Sheets

(56) References Cited

U.S. PATENT DOCUMENTS

| | | | |
|---|---|---|---|
| 8,516,298 | B2 | 8/2013 | Lu et al. |
| 8,527,806 | B2 | 9/2013 | Endou |
| 8,627,140 | B2 | 1/2014 | Hattori et al. |
| 9,734,013 | B2 | 8/2017 | Gupta et al. |
| 10,394,648 | B2 | 8/2019 | Niu et al. |
| 10,489,242 | B1 | 11/2019 | Chao et al. |
| 10,866,867 | B2 | 12/2020 | De Oliva |
| 11,157,342 | B2 | 10/2021 | Shin et al. |
| 11,237,928 | B2 | 2/2022 | Blagodurov et al. |
| 2011/0099458 | A1 | 4/2011 | Reche et al. |
| 2016/0110125 | A1 | 4/2016 | Orme et al. |
| 2020/0065203 | A1* | 2/2020 | Nguyen ............... G06F 3/0619 |
| 2020/0192798 | A1* | 6/2020 | Natu ................... G06F 12/12 |
| 2020/0218599 | A1 | 7/2020 | Elliott et al. |
| 2021/0081432 | A1 | 3/2021 | Grunwald et al. |
| 2021/0165721 | A1 | 6/2021 | Blagodurov et al. |
| 2022/0050603 | A1 | 2/2022 | Zhou et al. |

OTHER PUBLICATIONS

EPO Extended European Search Report dated Sep. 27, 2023, issued in corresponding European Patent Application No. 23173114.2 (7 pages).

\* cited by examiner

SYSTEMS AND METHODS FOR EXPANDABLE MEMORY ERROR HANDLING

CROSS-REFERENCE TO RELATED APPLICATION

This application claims priority to and the benefit of U.S. Provisional Application No. 63/343,410, filed on May 18, 2022, entitled "UE (UNCORRECTABLE ERROR) HANDLING ON CXL MEMORY," the entire content of which is incorporated by reference herein.

FIELD

One or more embodiments of the present disclosure relate to expandable memory, and more particularly, to error handling for expandable memory.

BACKGROUND

A machine check exception (MCE) is a type of hardware error that occurs when a system's central processing unit (CPU) detects an error in memory, I/O devices, the system bus, in the processor itself, and the like. A correctable memory error is typically a single-bit error that may be corrected by the system, and generally, does not result in system downtown or data corruption. On the other hand, an uncorrectable memory error is typically a multi-bit error indicating some critical or fatal event in the memory itself, which may typically be caused due to some failure in a memory module (e.g., a memory chip) that cannot be corrected by software/firmware.

The above information disclosed in this Background section is for enhancement of understanding of the background of the present disclosure, and therefore, it may contain information that does not constitute prior art.

SUMMARY

One or more embodiments of the present disclosure are directed to error handling for expandable memory, and more particularly, to generating faulty page information that may be persistently stored and used to automatically offline a faulty page of an expandable memory device.

One or more embodiments of the present disclosure are directed to sharing the faulty page information between a plurality of host devices for automatically offlining faulty pages of an expandable memory device.

According to one or more embodiments of the present disclosure, a system for handling faulty pages, includes: a host processor; host memory connected to the host processor over a first memory interface; and an expandable memory pool connected to the host processor over a second memory interface different from the first memory interface, the host memory including instructions that, when executed by the host processor, cause the host processor to: detect an error in a target page of a first memory device of the expandable memory pool; generate an interrupt in response to detecting the error; store, in a faulty page log, faulty page information corresponding to the target page of the first memory device; and change a status of the target page of the first memory device from a first state to a second state according to the faulty page log.

In an embodiment, the second memory interface may include a periphery component interconnect express (PCIe) interface and a compute express link (CXL) interconnect.

In an embodiment, the first memory interface may include dual in-line memory module (DIMM).

In an embodiment, the expandable memory pool may include at least two different types of compute express link (CXL) memory devices.

In an embodiment, the instructions may further cause the host processor to: perform a reboot; read the faulty page log to identify one or more faulty pages of the expandable memory pool; and set the second state of the one or more faulty pages according to the faulty page log.

In an embodiment, the instructions may further cause the host processor to: receive a log request for the faulty page log from a guest host processor configured to access the expandable memory pool; and transmit the faulty page log to the guest host processor in response to the log request. The guest host processor may be configured to set the second state of one or more pages of the expandable memory pool according to the faulty page log.

In an embodiment, the instructions may further cause the host processor to: receive an update from a first guest host processor that detects an error in a second memory device from among the expandable memory pool; identify a faulty page of the second memory device according to the update; update the faulty page log; and set the second state of the faulty page of the second memory device based on the updated faulty page log.

In an embodiment, the instructions may further cause the host processor to broadcast the updated faulty page log to a second guest host processor configured to access the expandable memory pool.

In an embodiment, the error may be a multi-bit error in the target page of the first memory device of the expandable memory pool, and the faulty page information may include physical device information of the target page of the first memory device.

According to one or more embodiments of the present disclosure, a method of handling faulty pages, includes: detecting, by a kernel of a first host device, an error in a target page of a first memory device of an expandable memory pool; generating, by the kernel, an interrupt in response to detecting the error; storing, by a device driver corresponding to the first memory device, faulty page information corresponding to the target page of the first memory device in a faulty page log; and changing, by a faulty page log (FPL) daemon, a status of the target page of the first memory device from a first state to a second state according to the faulty page log.

In an embodiment, the first memory device of the expandable memory pool may be connected to the first host device via a periphery component interconnect express (PCIe) interface and a compute express link (CXL) interconnect.

In an embodiment, the expandable memory pool may include at least two different types of compute express link (CXL) memory devices.

In an embodiment, the method may further include: performing, by the kernel, a reboot; reading, by the FPL daemon, the faulty page log to identify one or more faulty pages of the expandable memory pool; and setting, by the FPL daemon, the second state of the one or more faulty pages according to the faulty page log.

In an embodiment, the method may further include: receiving, by the FPL daemon of the first host device, a log request for the faulty page log from an FPL daemon of a second host device configured to access the expandable memory pool; and transmitting, by the FPL daemon of the first host device, the faulty page log to the second host device in response to the log request. The FPL daemon of the second host device may be configured to set the second state of one or more faulty pages of the expandable memory pool according to the faulty page log.

In an embodiment, the method may further include: receiving, by the FPL daemon of the first host device, an update from an FPL daemon of a second host device in response to the second host device detecting an error in a second memory device from among the expandable memory pool; identifying, by the FPL daemon of the first host device, a faulty page of the second memory device according to the update; updating, by the FPL daemon of the first host device, the faulty page log; and setting, by the FPL daemon of the first host device, the second state of the faulty page of the second memory device based on the updated faulty page log.

In an embodiment, the method may further include broadcasting, by the FPL daemon of the first host device, the updated faulty page log to a third host device configured to access the expandable memory pool.

In an embodiment, the error may be a multi-bit error in the target page of the first memory device of the expandable memory pool, and the faulty page information may include physical device information of the target page of the first memory device.

According to one or more embodiments of the present disclosure, a host device includes: a root complex connected to an expandable memory pool over a memory interface, and configured to parse a packet received from a memory device of the expandable memory pool; a kernel configured to detect an error bit corresponding to a faulty page of the first memory device from the parsed packet, and generate an interrupt in response to detecting the error bit; a driver of the first memory device configured to store faulty page information corresponding to the faulty page of the first memory device in a faulty page log in response to the interrupt; and a faulty page log (FPL) daemon configured to change a status of the faulty page from a first state to a second state based on the faulty page log.

In an embodiment, the expandable memory pool may include at least two different types of compute express link (CXL) memory devices.

In an embodiment, in response to a reboot, the FPL daemon may be configured to read the faulty page log to identify one or more faulty pages of the expandable memory pool, and set the second state of the one or more faulty pages according to the faulty page log.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
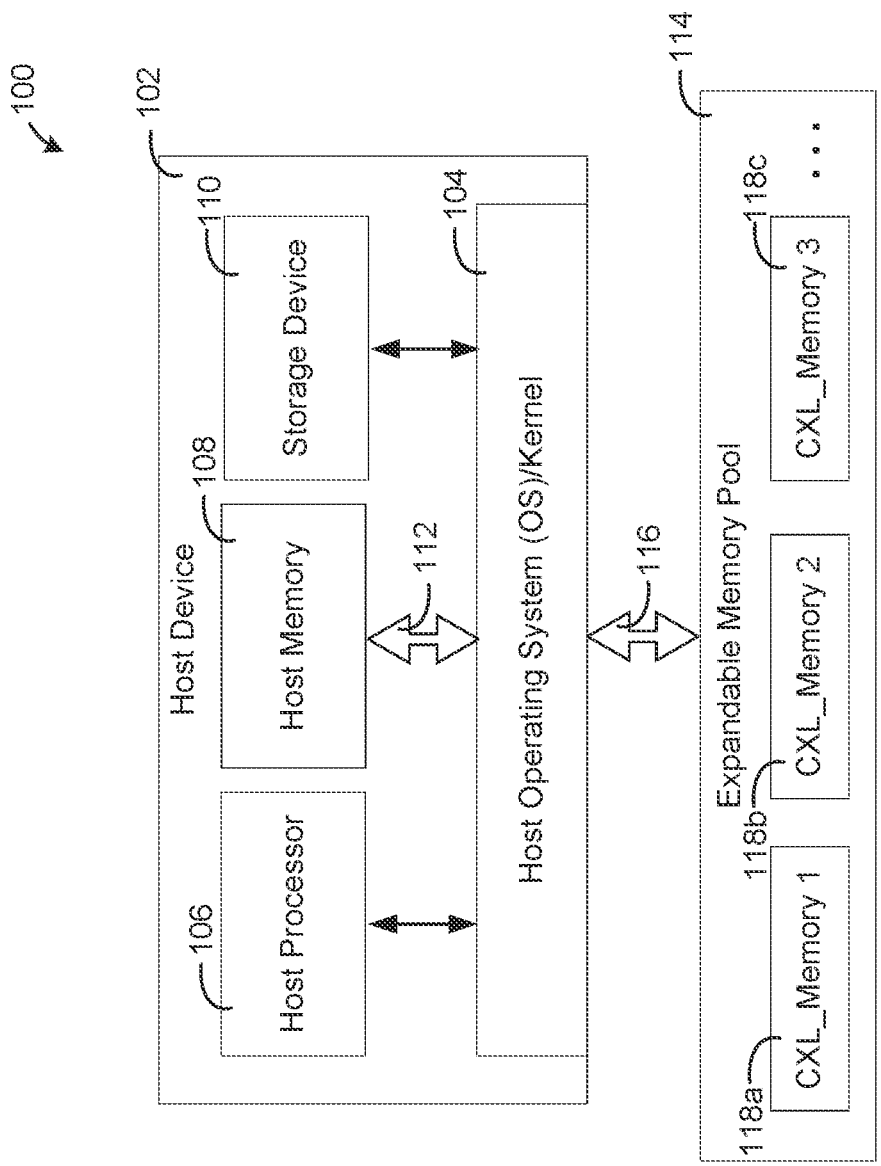
FIG. 1 is a schematic block diagram of an expandable memory system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

Generally, uncorrectable errors (e.g., multi-bit errors) in expandable memory may have little effect on system stability, as expandable memory typically may not be used for critical pages for the operation of the system, such as kernel pages, execution pages, non-relocatable pages, and the like. Thus, when an uncorrectable error occurs in a page of expandable memory, the likelihood of a system crash may be low, and thus, the page may simply be offlined (e.g., a status thereof may be changed from a first state (e.g., an online or available state) to a second state (e.g., an offline or unavailable state) such that any applications and/or processes accessing the page may be forced to be closed (e.g., may be killed). However, as a central processing unit (CPU) typically does not maintain information for the offlined pages, memory mapping to the faulty pages may continue to repeat, especially after a system reboot, and thus, user experience may be reduced.

Generally, system main memory (e.g., host memory) may be used for the critical pages to the operation of the system, such as kernel pages, application execution pages, non-relocatable pages, and the like, as well as pages for handling data, such as text pages, file pages, anonymous pages, moveable pages, and the like. Thus, to ensure system stability and prevent a system crash from occurring, when an uncorrectable error occurs in a page of system main memory, the system may be shut down such that a user (e.g., an administrator) may replace the memory device (e.g., a dynamic random access memory (DRAM) device or chip) in which the uncorrectable error occurred. Thus, an error log, such as a machine check exception (MCE) log, may simply contain an error message and some basic information for the user to be able to replace the system main memory device in which the uncorrectable error occurred.

On the other hand, expandable memory typically may not be used for critical pages, and instead, may be used only for handling data. Accordingly, unlike in the case of system main memory, when an uncorrectable error occurs in a page of the expandable memory, the page may be offlined (e.g., the page may be made unavailable), and any applications and/or processes accessing the page of the expandable memory may be forced to be closed (e.g., may be killed), while other pages of the expandable memory may be continued to be used. Accordingly, unlike the system main memory, which may be replaced when an uncorrectable error occurs therein, a usable lifetime of the expandable memory device may be extended or maximized by offlining the faulty pages, and thus, costs may be reduced.

However, typically, the system processor (e.g., a host processor) may not maintain the offlined pages of expandable memory, and thus, when the system is rebooted, memory mapping to the faulty pages may be repeated. Further, as the error logs typically do not include physical device information (e.g., device serial number, device type, and device physical address) of the faulty pages of expandable memory, the offlined pages may not be shared among different host processors. For example, because different systems may have different system mappings, the error logs of one host processor may be irrelevant to another host processor. Accordingly, different host processors may continue to memory map to the faulty pages of the expandable memory, even if the faulty pages are offlined by another host processor.

According to one or more embodiments of the present disclosure faulty page information for faulty pages in an expandable memory device may be generated and persistently stored in a faulty page log (FPL), even after a system reboot, such that the FPL may be used to automatically offline any faulty pages of the expandable memory device before memory mapping to the faulty pages may occur. Accordingly, user experience may be improved, and costs may be reduced.

According to one or more embodiments of the present disclosure, the FPL may include at least the physical device information (e.g., device serial number, device type, device physical address, and/or the like) of the faulty pages, which may remain relatively consistent compared to a logical address that may be changed based on the system's memory mapping. Accordingly, the FPL may be used even after a system reboot, hardware changes, and/or the like, during which the host physical address may be changed, to automatically offline the faulty pages before any memory mapping thereto may occur.

For example, the host physical address may be changed when the expandable memory is plugged into a different slot of the host device, or the expandable memory expander card is plugged into a slot of a different host device. In this case, the FPL including at least the physical device information of the expandable memory may enable remapping from the device physical address to the host physical address when such hardware changes are made. In some embodiments, when no hardware changes are made, the host physical address may be reused for offlining the faulty page.

According to one or more embodiments of the present disclosure, because the FPL may include at least the physical device information of the faulty pages, the FPL may be shared among a plurality of host devices (e.g., host processors), such that each of the host processors may offline the faulty pages in their own system mappings, and thus, any memory mapping to the faulty pages may be avoided. Accordingly, system reliability may be improved, and user experience may be improved.

The above and/or other aspects and features of the present disclosure will be described in more detail below with reference to the figures.

FIG. 1 is a schematic block diagram of an expandable memory system according to one or more embodiments of the present disclosure.

Referring to FIG. 1, a host device 102 may include an operating system/kernel 104, a host processor 106, host memory 108, and a storage device 110. The operating system/kernel 104 may include system software to provide an interface between hardware and a user, and between software applications and the hardware. For example, the operating system/kernel 104 may be configured for resource allocation, memory management, CPU management, file management, execution of processes, and/or the like for the host device 102. For example, in some embodiments, the operating system/kernel 104 may include a Linux operating system/kernel, but the present disclosure is not limited thereto, and the operating system/kernel 104 may include any suitable operating system/kernel as would be known to those skilled in the art, such as a Windows OS, an Apple OS (e.g., macOS), a Chrome OS, and the like.

The host processor 106 may be a processing circuit, for example, such as a general purpose processor or a central processing unit (CPU) core of the host device 102. The host processor 106 may be connected to other components via an address bus, a control bus, a data bus, and/or the like. The host processor 106 may execute instructions stored in the host memory 108 to perform the various operations described herein. For example, the host processor 106 may execute one or more system processes and background processes (which are described in more detail below), which may be copied from persistent storage (e.g., the storage device 110, read-only memory (ROM), and/or the like) to the host memory 108 as needed or desired (e.g., at startup, execution time, interrupt routine, and/or the like).

The host memory 108 may be considered as high performing main memory (e.g., primary memory) of the host device 102. For example, in some embodiments, the host memory 108 may include (or may be) volatile memory, for example, such as dynamic random access memory (DRAM) that may be directly connected to a memory slot of a motherboard of the host device 102 via a first memory interface 112. In this case, the first memory interface 112 (e.g., the connector and the protocol thereof) may include (or may conform to) dual in-line memory module (DIMM) to facilitate communications between the host memory 108 and the host processor 106 (e.g., via the host OS/kernel 104), such that the host memory 108 may be the DIMM memory connected to the DIMM slot of the host device 102. However, the present disclosure is not limited thereto, and the host memory 108 may include (or may be) any suitable high performing main memory (e.g., primary memory) replacement for the host device 102 as would be known to those skilled in the art. For example, in other embodiments, the host memory 108 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM), and can include, for example, chalcogenides, and/or the like.

The storage device 110 may be considered as secondary memory (e.g., secondary storage) that may persistently store data accessible by the host device 102. In this context, the storage device 110 may include (or may be) relatively slower memory when compared to the high performing main memory of the host memory 106. For example, in some embodiments, the storage device 110 may be a Solid-State Drive (SSD). However, the present disclosure is not limited thereto, and in other embodiments, the storage device 110 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 110 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 110 may conform to any suitable or desired derivative of these form factors.

The storage device 110 may be connected to the host processor 106 via a storage interface. The storage interface may facilitate communications (e.g., using a connector and a protocol) between the host processor 106 and the storage device 110 (e.g., via the host OS/kernel 104). In some embodiments, the storage interface may facilitate the exchange of storage requests and responses between the host processor 106 and the storage device 110. In some embodiments, the storage interface may facilitate data transfers by the storage device 110 to and from the host memory 108 of the host device 102. For example, in various embodiments, the storage interface (e.g., the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the storage interface (e.g., the connector and the protocol thereof) may include (or may conform to) various general-purpose interfaces, for example, such as Ethernet, Universal Serial Bus (USB), and/or the like.

Still referring to FIG. 1, the host device 102 is connected to an expandable memory pool 114 via a second memory interface 116 different from the first memory interface 112. The expandable memory pool 114 may include one or more expandable memory devices 118a, 118b, and 118c, for example, such as one or more compute express link (CXL) memory devices 118a, 118b, and 118c. In some embodiments, the expandable memory pool 114 may be a disaggregated CXL memory pool including a plurality of different types of CXL memory devices 118a, 118b, and 118c, which may typically include volatile memory such as DRAM, for example, from among DDR3, DDR4, DDR5, low-power, high-power, low-profile, PMEM, HBM, SSD with DRAM, and/or the like. However, the present disclosure is not limited thereto, and the expandable memory pool 114 may include (or may be) any suitable high performing expandable memory for the host device 102 as would be known to those skilled in the art, similar to the examples described above for the host memory 106.

In some embodiments, the second memory interface 116 (e.g., the connector and the protocol thereof) may include (e.g., may conform to) a CXL interconnect built on periphery component interconnect express (PCIe) to facilitate communications between the host processor 104 and the memory devices 118a, 118b, and 118c of the expandable memory pool 114 (e.g., via the host OS/kernel 104). In this case, each of the memory devices 118a, 118b, and 118c may be connected to a PCIe slot of the host device 102 as a PCIe device. In other embodiments, the second memory interface 116 (e.g., the connector and the protocol thereof) may include (or may conform to) various general-purpose interfaces, for example, such as Ethernet, Universal Serial Bus (USB), and/or the like. While FIG. 1 shows one host device 102 connected to the expandable memory pool 114, the present disclosure is not limited thereto, and a plurality of host devices 102 may be connected to the expandable memory pool 114 (e.g., see FIGS. 5 and 7).

Figure 2:
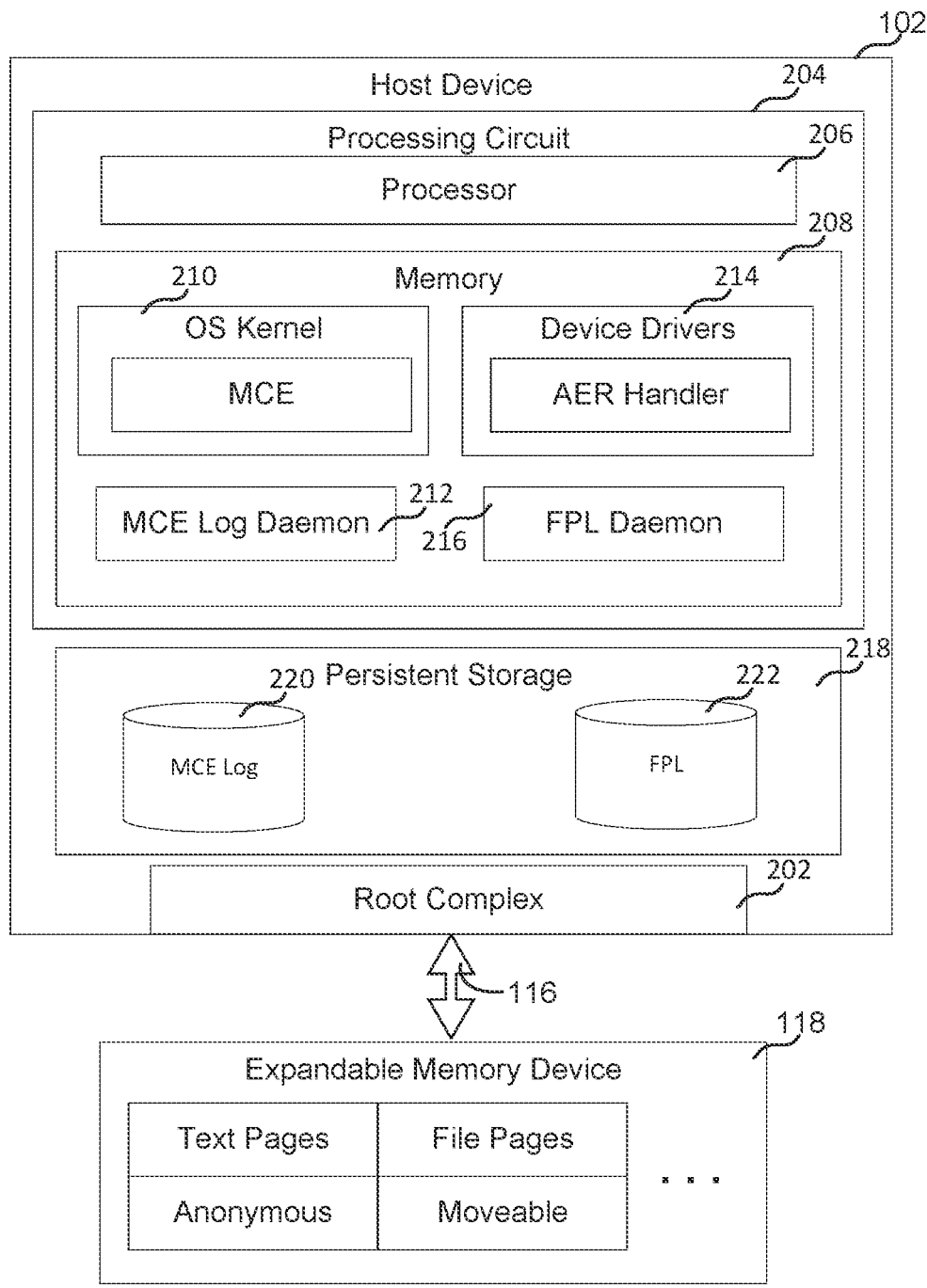
FIG. 2 is a schematic block diagram of a host device of the expandable memory system according to one or more embodiments of the present disclosure.

As described above, both the host memory 106 and the expandable memory pool 114 may be used as high performing main memory (e.g., primary memory) of the host device 102, such that they both may be used for data handling (e.g., for temporarily storing data to be processed by the host processor 106), for example, such as text pages, anonymous pages, file pages, moveable pages, and the like (e.g., see FIG. 2). However, while the host memory 106 may be further used for critical pages, such as OS kernel pages, application execution pages, non-relocatable pages, and/or the like, the expandable memory pool 114 may not be used for such critical pages. Thus, when an uncorrectable error occurs in a page of the host memory 106, the host memory 106 may be replaced to prevent or substantially prevent a system crash, whereas unlike the host memory 106, when an uncorrectable error occurs in a page of an expandable memory device 118 of the expandable memory pool 114, the page may simply be offlined (e.g., a status thereof may be changed from a first state (e.g., an online state or an available state) to a second state (e.g., an offline state or an unavailable state), such that any processes and/or applications accessing the page may be killed (e.g., forced to be closed). In other words, rather than being replaced like the host memory 108, when an uncorrectable error occurs in a page of the expandable memory pool 114, the page may be hard offlined as understood by those having ordinary skill in the art, such that the faulty page is no longer available for memory mapping. Accordingly, the usable lifetime of an expandable memory device 118 of the expandable memory pool 114 may be increased or maximized, and thus, costs may be reduced. As used herein, an uncorrectable error may refer to a multi-bit error (e.g., a 2-bit) error on the same cache line that may not be corrected (e.g., that may be uncorrectable) by the system software/firmware, whereas a correctable error may refer to a single-bit error, and is typically correctable by the system.

It should be noted that correctable errors in a page of the expandable memory pool 114 may be handled in much the same or substantially the same manner as that of correctable errors that may occur in a page of the host memory 106. For example, when a correctable error occurs, the data of the page with the correctable error may be migrated to another page, and the page with the correctable error may be soft offlined as understood by those having ordinary skill in the art, such that any applications or processes accessing the faulty page may be remapped to the migrated page. However, in some embodiments, the embodiments described in more detail below may also be extended to soft offlined pages, for example, by persistently storing faulty page information for the soft offlined pages in a faulty page log. In this case, the faulty page log may be used to offline the pages as needed or desired, for example, at startup (or after a reboot) of the system 100. For convenience, the embodiments described in more detail hereinafter may be described in the context of hard offlined pages in response to an uncorrectable error (e.g., a two-bit error on the same cache line), but the present disclosure is not limited thereto, and at least some of the embodiments described herein may also be applicable to soft offlined pages in response to a correctable error.

FIG. 2 is a schematic block diagram of a host device of the expandable memory system according to one or more embodiments of the present disclosure.

Referring to FIG. 2, the host device 102 is connected to an expandable memory device 118 of the expandable memory pool 114 via the second memory interface 116. For example, in some embodiments, the expandable memory device 118 may be connected to a port (e.g., a PCIe port) of a root complex 202 (e.g., via the second memory interface 116) of the host device 102, such that the expandable memory device 118 may be considered as a PCIe device. In this case, the root complex 202 may connect a processor 206 (e.g., the host processor 106 in FIG. 1) to the expandable memory device 118 to generate transaction requests on behalf of the processor 206 to the expandable memory device 118. The root complex 202 may be implemented as an integrated circuit, or the functions thereof may be implemented as part of the processor 206 (e.g., as instructions stored in memory 208 and executed by the processor 206).

In brief overview, when an uncorrectable error occurs in a target page of the expandable memory device 118, a target register of the expandable memory device may generate an error bit (e.g., a poison bit) in a target packet (e.g., in a translation layer packet), and provides the target packet to the root complex 202. The root complex 202 parses the target packet and transmits the parsed target packet including the error bit to the processor 206 (e.g., the host processor 106). The processor 206 generates an interrupt based on the error bit, and persistently stores faulty page information including at least physical device information (e.g., device serial number, device type, device physical address, and/or the like) of the target page in a faulty page log FPL 222. The processor 206 may offline the target page according to the FPL 222, and may kill any processes or applications that access the target page. The FPL 222 may be persistently stored in persistent storage 218 (e.g., the storage device 110 in FIG. 1 or the like), such that the faulty page information may be maintained in the FPL 222 even after a system reboot. Accordingly, in some embodiments, when the system is rebooted, the FPL 222 may be read for each of the expandable memory devices 118 in the expandable memory pool 114, such that the faulty pages identified in the FPL 222 may be automatically offlined before any memory mapping to the faulty pages occur, and thus, error logs (e.g., MCE logs) may be reduced and user experience may be improved.

In more detail, the host device 102 may include the root complex 202, a processing circuit 204, and persistent storage 218 (e.g., the storage device 110 or the like). The root complex 202 may connect (e.g., via a local bus or the like) the processing circuit 204 to the expandable memory device 118 via the second memory interface 116. For example, as discussed above, the second memory interface 116 (e.g., the connector and the protocol thereof) may include (e.g., may conform to) a CXL interconnect built on periphery component interconnect express (PCIe), such that the expandable memory device 118 may be a PCIe device connected to a PCIe port of the root complex 202. While FIG. 2 shows the root complex 202 as being separate from the processing circuit 204, the present disclosure is not limited thereto, and in some embodiments, the root complex 202 may be implemented as part of the processing circuit 204 (e.g., as an integrated circuit or as part of the processor 206).

The processing circuit 204 includes one or more processors 206 (e.g., which may include the host processor 106 in FIG. 1), and memory 208 (e.g., the host memory 108, a ROM, and/or the like). The processing circuit 204 may be connected to (or may include) the root complex 202, such that the processing circuit 204 and the various components thereof can send and receive data with the expandable memory device 118 via the root complex 202. The processor 206 may be implemented with a general-purpose processor such as a central processing unit (e.g., a CPU), an application-specific integrated circuit (ASIC), one or more field programmable gate arrays (FPGAs), a digital signal processor (DSP), a group of processing components, or other suitable electronic processing components capable of executing instructions (e.g., via firmware and/or software). The processing circuit 204 and the processor 206 may be housed in a single geographic location or device, or may be distributed over various geographic locations or devices.

The memory 208 (e.g., one or more memory devices, and/or memory units) may include tangible, non-transient, volatile memory or non-volatile memory, such as RAM (e.g., DRAM), ROM, NVRAM, or Flash Memory. The memory 208 may be communicably connected to the processor 206 via the processing circuit 204, and includes data and/or computer code for facilitating (e.g., by processing circuit 204 and/or the processor 206) at least some of the various processes described herein. For example, the memory 208 may include database components, object code components, script components, and/or any other type of information or data structure for supporting the various activities and information or data structures described in the present application. The memory 208 stores instructions or programming logic that, when executed by the processor 206, controls the various operations of the host device 102 described herein.

As shown in FIG. 2, the memory 208 may include an OS kernel 210, a machine check exception (MCE) log daemon 212, device drivers 214, and a faulty page log (FPL) daemon 216, which may correspond to various different instructions that are copied to the memory 208 from persistent storage (e.g., the storage device 110, a ROM, and/or the like) as needed or desired (e.g., at execution time, after an interrupt, after a reboot, and/or the like). For example, the OS kernel 210 may include various system software to provide an interface between software applications and the hardware (e.g., the CPU, memory, storage, and the like), and the device drivers 214 may include a device driver for each of the expandable memory devices 118 of the expandable memory pool 114. The MCE log daemon 212 and the FPL daemon 216 may include (or may be) various background processes that may be called, for example, in response to an interrupt or after a reboot.

The OS kernel 210 may detect machine check exceptions (MCE) from various hardware, such as from the host processor 106, the host memory 108, the storage device 110, the expandable memory device 118, and/or the like, and may provide some error information to a user (e.g., a system administrator) via an error log or a system console. In the event that the MCE corresponds to an uncorrectable error detected from a page in the host memory 108, the OS kernel 210 may shutdown the system to prevent a system crash if the page is critical for the system, and in this case, mostly nothing may be logged. In some embodiments, the MCE log daemon 212, which may be a third party user application, may be further included to provide some additional information (e.g., host physical address, if supported, memory mapping information, and the like) regarding the detected MCE, and may store the additional information in, for example, an MCE log 220. However, the MCE log 220 is mostly used for the host memory 108, and thus, may not log complete information pertaining to an uncorrectable error in a faulty page of the expandable memory 118, as the expandable memory 118 may simply be regarded as a memory extension attached on a PCIe slot of the host device 102. In other words, the MCE log 220 may not contain the faulty page information (e.g., the physical device information) of the expandable memory. Thus, the MCE log 220 may simply store information that identifies the memory device of the host memory 108 needing replacement, which may include the physical address of the faulty page of the host memory 108, if supported, but may be insufficient for storing the faulty page information for uncorrectable errors in the expandable memory devices 118 of the expandable memory pool 114, as all of the expandable memory devices 118 attached on the CXL/PCIe/network may be regarded as memory extensions.

According to one or more embodiments of the present disclosure, when the MCE corresponds to an uncorrectable error detected from a page in the expandable memory 118, the faulty page information (e.g., the physical device information, such as device serial number, device type, device physical address, and/or the like) may be persistently stored in the FPL 222, and may be used to automatically offline the faulty pages in the expandable memory 118, even in the case of hardware configuration changes and/or server changes. For example, if an expandable memory device 118 is moved from slot 1 to slot 2, the HDM range may be changed, and such changes may not be tracked by the expandable memory device 118. On the other hand, because the FPL 222 persistently stores the faulty page information, such information may be used to offline the faulty pages in the expandable memory device 118, even in the case of such changes.

In more detail, when the OS kernel 210 detects the MCE corresponding to a target page of the expandable memory device 118 (e.g., based on the parsed error bit from the root complex 202), the OS kernel 210 may generate an interrupt of an application or process accessing the target page of the expandable memory device 118, and may call a device driver 214 of the expandable memory device 118 in order to handle the interrupt. The device driver 214 of the expandable memory device 118 may include an advanced error reporting (AER) handler to process the MCE detected in the expandable memory device 118 in response to the interrupt. For example, if the MCE corresponds to an uncorrectable error (e.g., a 2-bit error on the same cache line) of the target page in the expandable memory device 118, the AER handler of the expandable memory device 118 may generate faulty page information including at least the physical device information (e.g., device serial number, device type, device physical address, and/or the like) of the target page of the expandable memory device 118, and may persistently store the faulty page information in the FPL 222. Thus, after a reboot or even in the case of hardware configuration changes, because the physical device information may remain relatively constant, the faulty page information of the faulty page stored in the FPL 222 may be used to identify the faulty pages of the expandable memory device 118 that may need to be offlined. For example, the AER handler of the expandable memory device 118 may initiate the FPL daemon 216 to change a status of the faulty page of the expandable memory device 118 from a first state (e.g., an online or an available state) to a second state (e.g., an offline or an unavailable state) to offline the target page according to the faulty page information that is persistently stored in the FPL 222.

In some embodiments, because the faulty page information may be persistently stored in the FPL 222, the host device 102 may further provide an interface (e.g., an Application Programming Interface (API)) to the user (e.g., the system administrator) to enable the user to insert or delete the faulty page information in the FPL 222 for debugging purposes and/or for reliability, availability, and serviceability (RAS) feature compliance testing purposes. For example, because the faulty page information is used to automatically offline pages after a system reboot, hardware changes, and/or the like, there may be no way to access the faulty pages after the system reboot, unless the faulty page information thereof is removed from the FPL 222. Thus, in some embodiments, the APIs may allow the user to remove a faulty page from the faulty page list, for example, so that it can be accessed for testing purposes even after the system reboot, or after a replacement of the expandable memory device 118.

Figure 3:
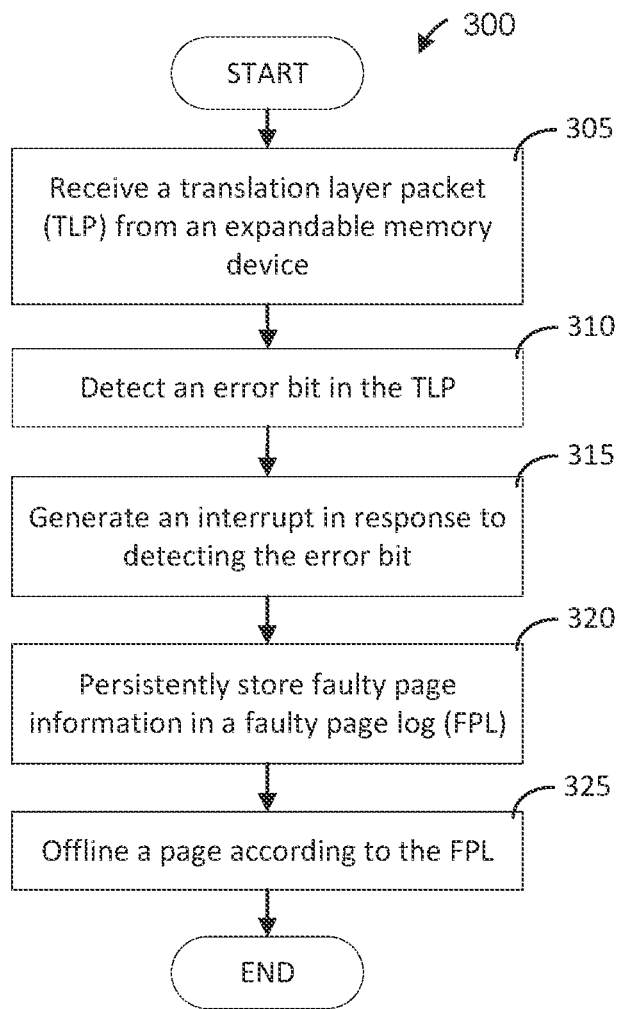
FIG. 3 is a flow diagram of a method of generating a faulty page log for an expandable memory device according to one or more embodiments of the present disclosure.

FIG. 3 is a flow diagram of a method of generating a faulty page log for an expandable memory device according to one or more embodiments of the present disclosure.

For example, the method 300 may be performed by the processor 206 of the host device 102 shown in FIG. 2. However, the present disclosure is not limited thereto, and the operations shown in the method 300 may be performed by any suitable one of the components and elements or any suitable combination of the components and elements of those of one or more embodiments described above. Further, the present disclosure is not limited to the sequence or number of the operations of the method 300 shown in FIG. 3, and can be altered into any desired sequence or number of operations as recognized by a person having ordinary skill in the art. For example, in some embodiments, the order may vary, or the method 300 may include fewer or additional operations.

Referring to FIGS. 2 and 3, the method 300 may start, and a translation layer packet (TLP) may be received from an expandable memory device at block 305. For example, the expandable memory device 118 may generate an error bit (e.g., a 2-bit error) in a header of the TLP for a target page, and may transmit the TLP to the host device 102 (e.g., the root complex 202) accessing the target page.

The error bit in the TLP may be detected at block 310, and an interrupt may be generated in response to detecting the error bit at block 315. For example, in some embodiments, the OS kernel 210 may receive the TLP from the root complex 202, and may detect the error bit in the TLP. In response to detecting the error bit, the OS kernel 210 may generate an interrupt, and may initiate the AER handler that is registered in the device driver 214 of the expandable memory device 118.

Faulty page information may be persistently stored in a faulty page log FPL at block 320. For example, as part of the interrupt routine of the AER handler of the expandable memory device 118, the AER handler may store the faulty page information (e.g., device serial number, device type, device physical address, and/or the like) of the faulty page of the expandable memory device 118 in the FPL 222, and may initiate the FPL daemon 216.

The faulty page may be offlined according to the FPL at block 325, and the method 300 may end. For example, the FPL daemon 216 may read the FPL 222, and may offline the faulty page of the expandable memory device 118 according to the physical device information thereof stored in the FPL 222. Any processes or applications accessing the faulty page may be killed in response to the offlining of the faulty page, and the method 300 may end.

Figure 4:
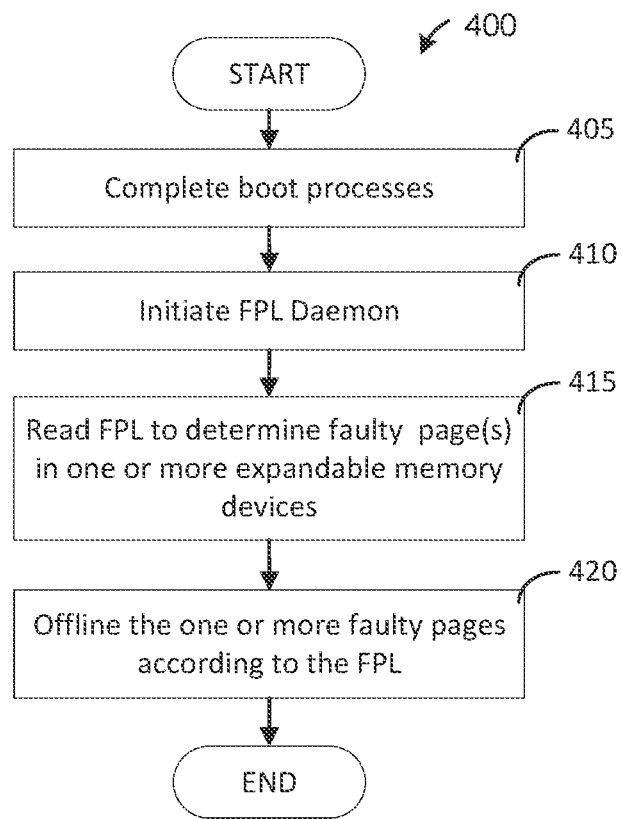
FIG. 4 is a flow diagram of a method of offlining a faulty page of an expandable memory device after a system reboot.

FIG. 4 is a flow diagram of a method of offlining a faulty page of an expandable memory device after a system reboot according to one or more embodiments of the present disclosure.

For example, the method 400 may be performed by the processor 206 of the host device 102 shown in FIG. 2. However, the present disclosure is not limited thereto, and the operations shown in the method 400 may be performed by any suitable one of the components and elements or any suitable combination of the components and elements of those of one or more embodiments described above. Further, the present disclosure is not limited to the sequence or number of the operations of the method 400 shown in FIG. 4, and can be altered into any desired sequence or number of operations as recognized by a person having ordinary skill in the art. For example, in some embodiments, the order may vary, or the method 400 may include fewer or additional operations.

Referring to FIG. 2 and FIG. 4, the method 400 may start when the system is rebooted, such that any boot processes (e.g., startup processes) may be completed at block 405, and an FPL daemon may be initiated at block 410. For example, as described above, in some embodiments, the FPL daemon 216 may be initiated after a system reboot to automatically offline the faulty pages identified in the FPL 222. For example, in some embodiments, the FPL daemon 216 may be a background process initiated (e.g., via a registration in/etc/init.d/fpld) after the booting is completed, and may read the FPL 222 (e.g., from persistent storage 218) to determine one or more faulty pages in one or more expandable memory devices at block 415. It should be noted that the FPL 222 may not need to be updated in the memory initialization phase, because the expandable memory 118 may not include system critical pages or memory types.

The one or more faulty pages may be offlined according to the FPL at block 420, and the method 400 may end. For example, the FPL daemon 216 may automatically offline each of the faulty pages identified in the FPL 222 for each of the expandable memory devices 118 of the expandable memory pool 114 after the system reboot, but prior to any memory mapping thereto. Here, because the FPL 222 may include the physical device information of the faulty pages, the faulty pages may be identified even if the system memory mapping information (e.g., the logical address) is changed after the system reboot. Accordingly, error logs may be reduced, and user experience may be improved.

Figure 5:
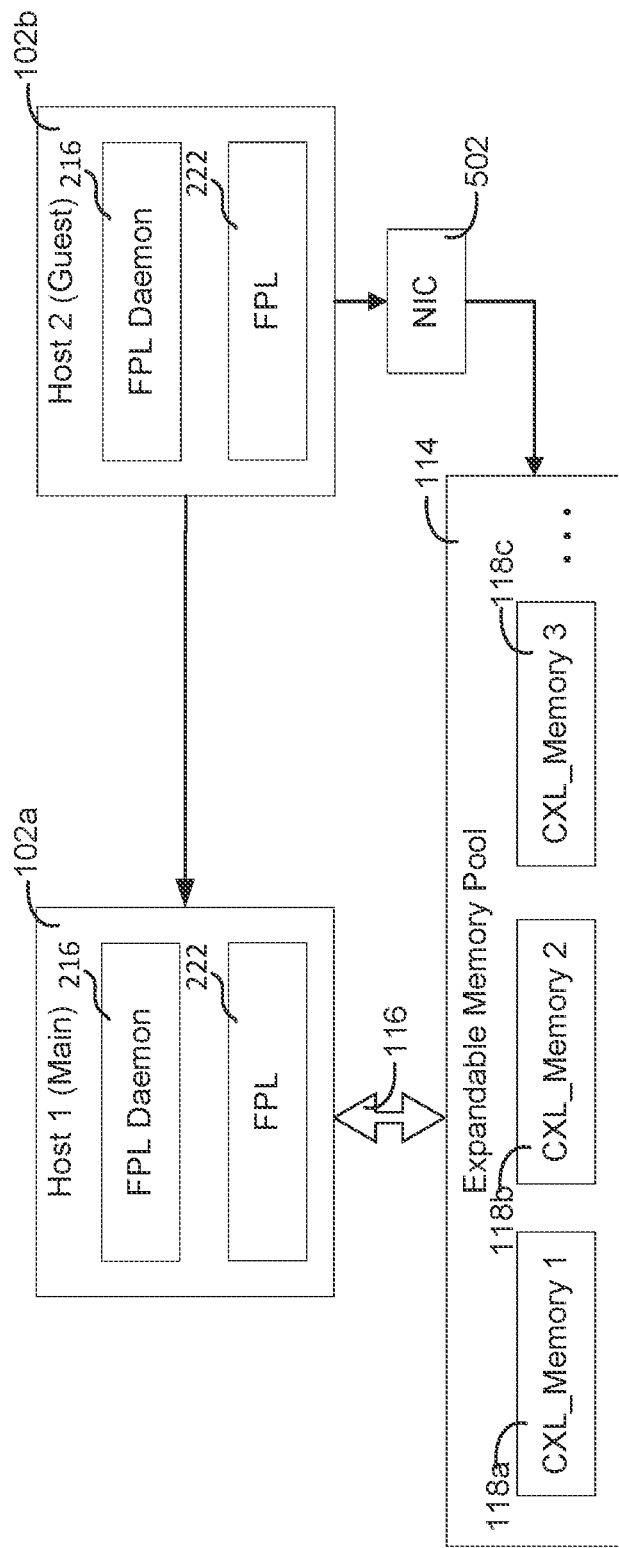
FIG. 5 is a schematic block diagram of an expandable memory system according to one or more embodiments of the present disclosure.

FIG. 5 is a schematic block diagram of an expandable memory system according to one or more embodiments of the present disclosure.

Referring to FIG. 5, an expandable memory system may include a first host device 102a and a second host device 102b, each connected to the expandable memory pool 114. For example, the first host device 102a may be connected to the expandable memory pool 114 via the second memory interface 116. The first host device 102a may be the same or substantially the same as the host device 102 described above, and thus, redundant description thereof may not be repeated. Similarly, the expandable memory pool 114 and the second memory interface 116 may be the same or substantially the same as those described above, and thus, redundant description thereof may not be repeated.

The second host device 102b may have a similar configuration as that of the host device 102 described above. For example, the second host device 102b may include a host operating system (OS)/Kernel 104, a host processor 106, a host memory 108 connected via a first memory interface 112, and a storage device 110 connected via a storage interface, and thus, redundant description thereof may not be repeated. In some embodiments, the expandable memory pool 114 may be a network attached expandable memory pool with respect to the second host device 102b. Thus, the second host device 102b may be connected to the expandable memory pool 114 via a network interface (e.g., a network interface controller or card (NIC)) 502 over a suitable communications network (e.g., the Internet, a wide area network, a local area network, a cellular network, and/or the like).

As described in more detail below with reference to FIG. 6, in some embodiments, before accessing the expandable memory devices 118a, 118b, and 118c of the expandable memory pool 114, the FPL daemon 216 of the second host device 102b may communicate with the first host device 102a to copy the FPL 222 from the first host device 102a, and may use the FPL 222 to offline the faulty pages of each of the expandable memory devices 118a, 118b, and 118c prior to accessing the expandable memory pool 114. Thus, the system memory mapping of the second host device 102b may exclude the faulty pages in the FPL 222, and thus, error logs may be reduced and user experience may be improved.

Figure 6:
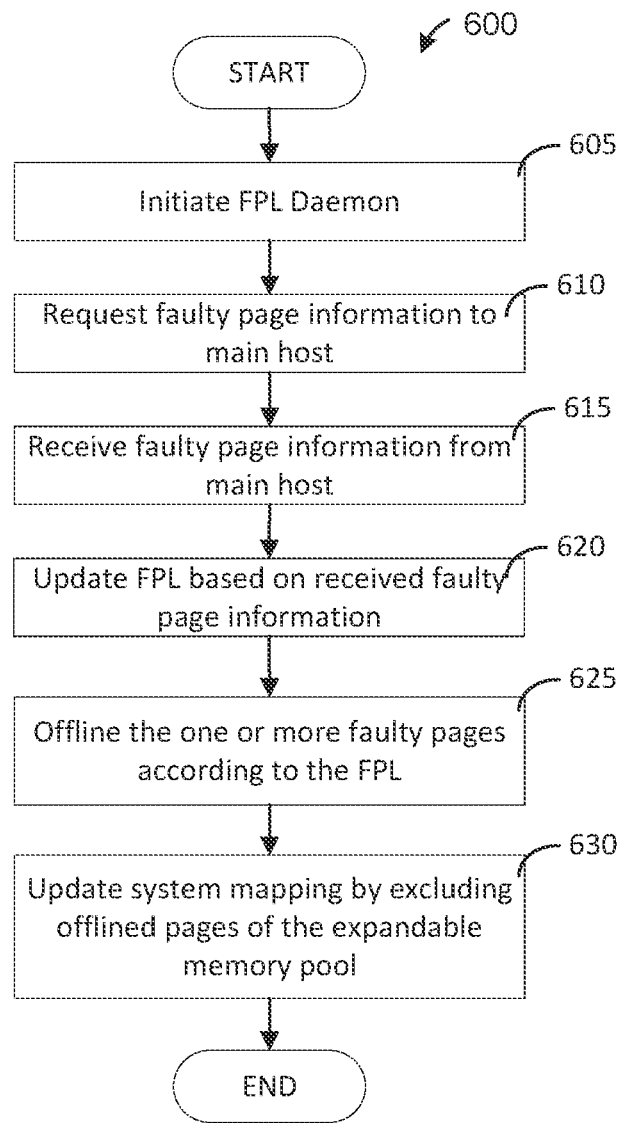
FIG. 6 is a flow diagram of a method of sharing faulty page information for an expandable memory device according to one or more embodiments of the present disclosure.

FIG. 6 is a flow diagram of a method of sharing faulty page information for an expandable memory device according to one or more embodiments of the present disclosure.

For example, the method 600 may be performed by a processing circuit 204 (e.g., including a processor 206, and memory 208 storing instructions executed by the processor 206) of the second host device 102b shown in FIG. 5, which may be the same or substantially the same as that described above with reference to FIG. 2, and thus, redundant description thereof may not be repeated. However, the present disclosure is not limited thereto, and the operations shown in the method 600 may be performed by any suitable one of the components and elements or any suitable combination of the components and elements of those of one or more embodiments described above. Further, the present disclosure is not limited to the sequence or number of the operations of the method 600 shown in FIG. 6, and can be altered into any desired sequence or number of operations as recognized by a person having ordinary skill in the art. For example, in some embodiments, the order may vary, or the method 600 may include fewer or additional operations.

Referring to FIG. 5 and FIG. 6, the method 600 may start, and an FPL daemon may be initiated at block 605. For example, in some embodiments, the FPL daemon of the second host device 102b may be initiated prior to accessing the expandable memory pool 114. Here, because the system mapping (e.g., the logical mapping) of the first host device 102a may be different from that of the second host device 102b, the second host device 102b may initiate its FPL daemon 216 to copy the FPL 222 of the first host device 102a. Accordingly, faulty page information may be requested to the main host (e.g., the first host 102a) at block 610, and the faulty page information may be received from the main host at block 615. For example, the FPL daemon 216 of the second host device 102b may transmit a log request to the first host device 102a for the faulty page information stored in the FPL 22 of the first host device 102a, and the first host device 102a may transmit the faulty page information (or the FPL 222) stored in the FPL 222 of the first host device 102a to the second host device 102b in response to the log request.

The FPL may be updated based on the received faulty page information at block 620, and one or more faulty pages may be offlined according to the FPL at block 625. For example, the second host device 102b may update its FPL 222 based on the received faulty page information, and may offline one or more faulty pages of each of the expandable memory devices 118a, 118b, and 118c of the expandable memory pool 114 based on the updated FPL 222. Here, because the FPL 222 may include at least the physical device information of the faulty pages of the expandable memory devices 118, the second host device 102b (e.g., the FPL daemon 222) may offline the faulty pages, even if the system mapping (e.g., the logical mapping) of the first and second host devices 102a and 102b are different from each other.

Accordingly, the system mapping may be updated by excluding the offlined pages of the expandable memory pool at block 630, and the method 600 may end. For example, the second host device 102b may update (or may memory map) its system mapping based on the offlined pages prior to accessing the expandable memory pool 114, such the faulty pages of the expandable memory pool 114 may not be accessed by one or more applications or processes of the second host device 102b. Accordingly, error logs may be reduced, and user experience may be improved.

Figure 7:
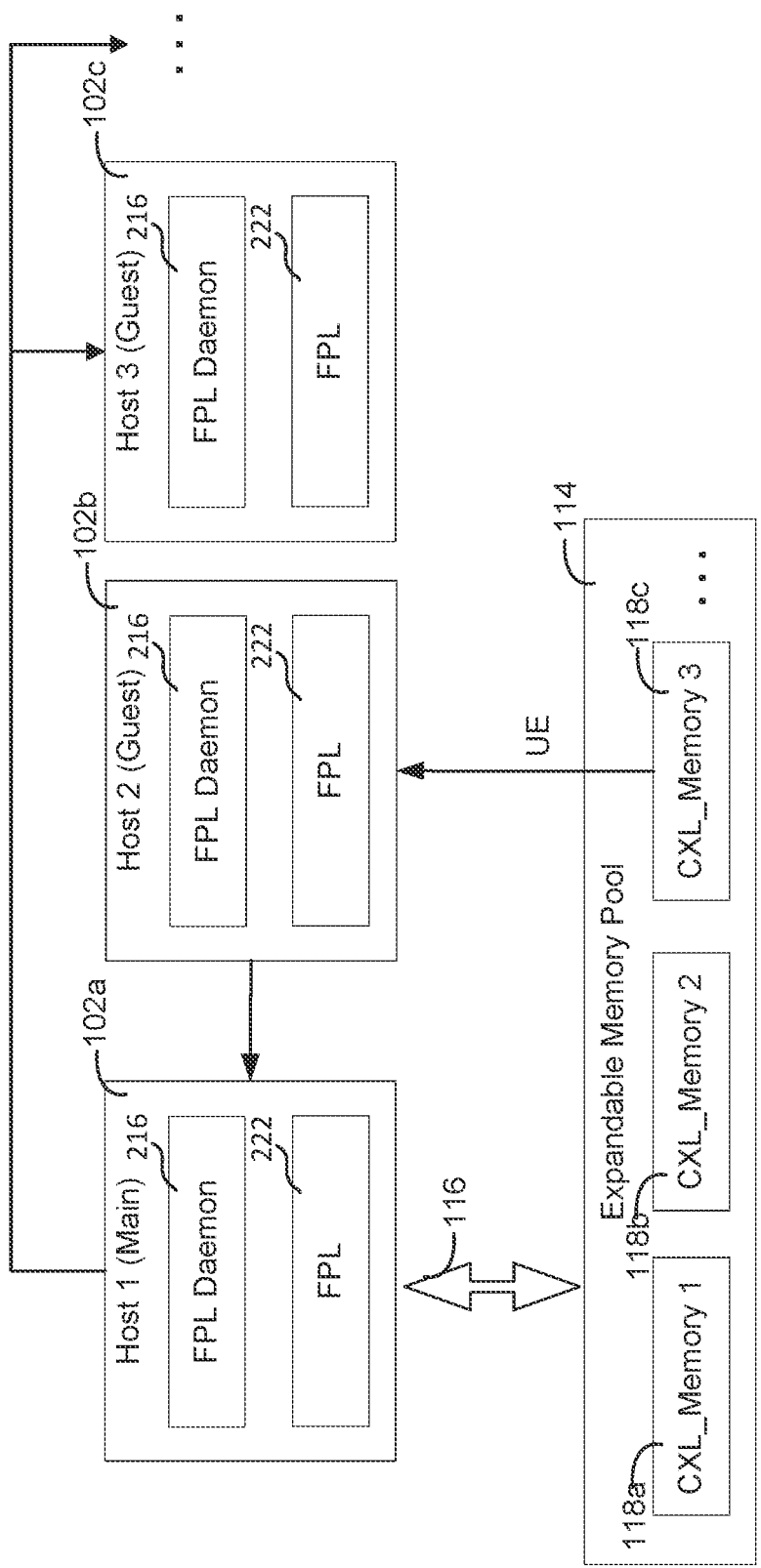
FIG. 7 is a schematic block diagram of an expandable memory system according to one or more embodiments of the present disclosure.

FIG. 7 is a schematic block diagram of an expandable memory system according to one or more embodiments of the present disclosure.

Referring to FIG. 7, an expandable memory system may include a first host device 102a, a second host device 102b, a third host device 102c, and the like, each connected to the expandable memory pool 114. For example, the first host device 102a may be connected to the expandable memory pool 114 via the second memory interface 116. The first host device 102a may be the same or substantially the same as the host device 102 described above, and thus, redundant description thereof may not be repeated. Similarly, the expandable memory pool 114 and the second memory interface 116 may be the same or substantially the same as those described above, and thus, redundant description thereof may not be repeated.

The second host device 102b and the third host device 102c may each have a similar configuration as that of the host device 102 described above. For example, in some embodiments, like the host device 102, the second host device 102b and the third host device 102c may each include a host operating system (OS)/Kernel 104, a host processor 106, a host memory 108 connected via a first memory interface 112, and a storage device 110 connected via a storage interface, and thus, redundant description thereof may not be repeated. In some embodiments, the expandable memory pool 114 may be a network attached expandable memory pool with respect to the second host device 102b and the third host device 102c. Thus, the second host device 102b and the third host device 102c may each be connected to the expandable memory pool 114 via a network interface (e.g., a network interface controller or card (NIC)) over a suitable communications network (e.g., the Internet, a wide area network, a local area network, a cellular network, and/or the like).

As shown in FIG. 7, the second host device 102b may receive an error bit (e.g., a 2-bit error on the same cache line) UE generated by a third expandable memory device 118c from among the expandable memory pool 114. In this case, the other host devices (e.g., the first host device 102a and the third host device 102c) may not be aware of the error that occurred in a target page of the third memory device 118c, as the other host devices may not be mapped to (or may not be accessing) the target page of the third memory device 118c. Further, because the system mapping (e.g., the logical mapping) of the first host device 102a and the third host device 102c may be different from that of the second host device 102b, the second host device 102b may transmit the updated FPL to at least one of the first host device 102a and the third host device 102c.

For example, as described in more detail below with reference to FIG. 8, in some embodiments, the second host device 102b (e.g., the AER handler registered thereon corresponding to the third expandable memory device 118c) may update its FPL 222 in response to the error bit, and may initiate its FPL daemon 216 to offline the faulty page. The FPL daemon 216 of the second host device 102b may communicate with the first host device 102a to transmit the updated FPL 222 to the first host device 102a. The first host device 102a may update its FPL 222 according to the update received from the second host device 102b, and may broadcast the update to other host devices (e.g., the third host device 102c and the like) that are registered with the first host device 102a to access the expandable memory pool 114.

In another embodiment, if the second host device 102b is in communications with the other host devices (e.g., the third host device 102c and the like), the second host device 102b may directly broadcast the update to the other host devices (e.g., the first host device 102a and the third host device 102c), rather than transmitting the update first to the first host device 102a, and the first host device 102a broadcasting the update to the other remaining host devices (e.g., the third host device 102c and the like). However, other suitable modifications may be possible depending on an implementation of the expandable memory system and a communication configuration between the host devices.

Figure 8:
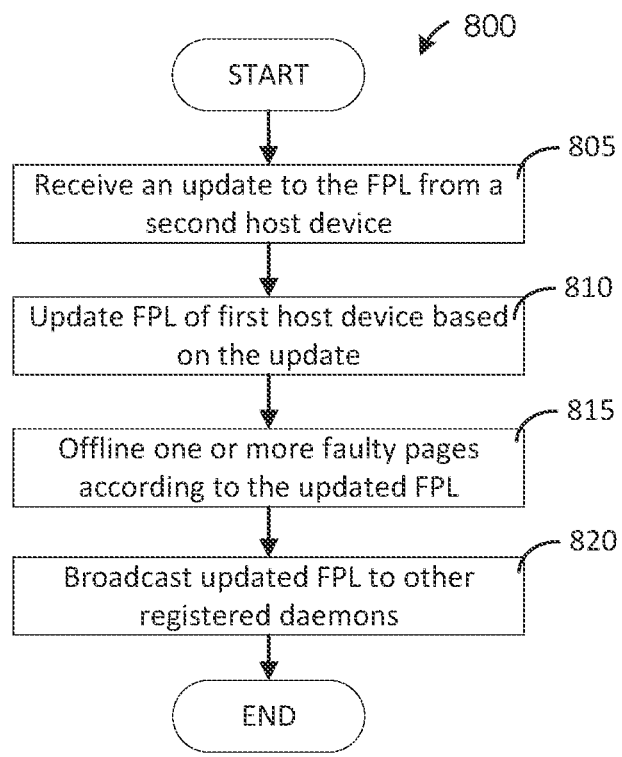
FIG. 8 is a flow diagram of a method of updating faulty page information for an expandable memory device according to one or more embodiments of the present disclosure.

FIG. 8 is a flow diagram of a method of updating faulty page information for an expandable memory device according to one or more embodiments of the present disclosure.

For example, the method 800 may be performed by a processing circuit 204 (e.g., including a processor 206, and memory 208 storing instructions executed by the processor 206) of the first host device 102a shown in FIG. 7, which may be the same or substantially the same as that of the host device 102 described above with reference to FIG. 2, and thus, redundant description thereof may not be repeated. However, the present disclosure is not limited thereto, and the operations shown in the method 800 may be performed by any suitable one of the components and elements or any suitable combination of the components and elements of those of one or more embodiments described above. Further, the present disclosure is not limited to the sequence or number of the operations of the method 800 shown in FIG. 8, and can be altered into any desired sequence or number of operations as recognized by a person having ordinary skill in the art. For example, in some embodiments, the order may vary, or the method 800 may include fewer or additional operations.

Referring to FIG. 7 and FIG. 8, the method 800 may start, and an update to the FPL may be received from a second host device at block 805. For example, in some embodiments, as shown in FIG. 7, the second host device 102b may receive an error bit UE from a target page of a third expandable memory device 118c. The first host device 102a and the third host device 102c may not receive the error bit UE from the target page of the third expandable memory device 118c. For example, the first host device 102a and the third host device 102c may not be mapped to and/or may not be accessing the target page of the third expandable memory device 118c. In response to receiving the error bit UE from the target page of the third expandable memory device 118c, the second host device 102b may update its FPL 222 and may offline the target page according to the updated FPL 222. The second host device 102b (e.g., the FPL daemon 216 thereof) may transmit the update to the first host device 102a over a suitable communication interface.

The FPL of the first host device may be updated based on the update at block 810. For example, the processor 206 (e.g., the FPL daemon 216) of the first host device 102*a* may update its FPL 222 based on the update received from the second host device 102*b*. One or more faulty pages may be offlined according to the updated FPL at block 815. For example, because the system mapping (e.g., the logical mapping) of the first host device 102*a* may be different from that of the second host device 102*b*, the one or more faulty pages identified from the updated FPL (e.g., based on the physical device information thereof) may be offlined in the system mapping of the first host device 102*a* based on the updated FPL.

The updated FPL may be broadcasted to other registered daemons at block 820, and the method 800 may end. For example, because the system mapping (e.g., the logical mapping) of the other host devices (e.g., the third host device 102*c* and the like) may be different from those of the first host device 102*a* and the second host device 102*b*, the physical device information of the one or more faulty pages may be broadcast, such that the system mapping of the other host devices may be updated and offlined based on the updated FPL. Thus, error logs may be reduced and user experience may be improved.

According to one or more embodiments of the present disclosure described above, faulty page information for each of the expandable memory devices of an expandable memory pool may be generated and persistently stored in a faulty page list, and used to automatically offline the faulty pages as needed or desired. According to one or more embodiments of the present disclosure described above, the faulty page information may include at least the physical device information (e.g., device serial number, device type, device physical address, and/or the like) of the faulty pages, such that the faulty pages may be offlined even when the system mapping (e.g., the logical address) of the faulty pages are changed or are different. Accordingly, error logs may be reduced, while extending the usable lifetime of the expandable memory devices in the expandable memory pool.

When a certain embodiment may be implemented differently, a specific process order may be different from the described order. For example, two consecutively described processes may be performed at the same or substantially at the same time, or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A system for handling faulty pages, comprising:
a host processor;
host memory connected to the host processor over a first memory interface; and
an expandable memory pool connected to the host processor over a second memory interface different from the first memory interface,
wherein the host memory comprises instructions that, when executed by the host processor, cause the host processor to:
detect an error in a target page of a first memory device of the expandable memory pool;
generate an interrupt in response to detecting the error;
store, in a faulty page log, faulty page information corresponding to the target page of the first memory device;
change a status of the target page of the first memory device from a first state to a second state according to the faulty page log; and
transmit the faulty page loci to configure a memory mapping to the expandable memory pool according to one or more faulty pages indicated by the faulty page log.

2. The system of claim 1, wherein the second memory interface comprises a periphery component interconnect express (PCIe) interface and a compute express link (CXL) interconnect.

3. The system of claim 2, wherein the first memory interface comprises a dual in-line memory module (DIMM).

4. The system of claim 1, wherein the expandable memory pool comprises at least two different types of compute express link (CXL) memory devices.

5. The system of claim 1, wherein the instructions further cause the host processor to:
perform a reboot;
read the faulty page log to identify the one or more faulty pages of the expandable memory pool; and
set the second state of the one or more faulty pages according to the faulty page log.

6. The system of claim 1, wherein to transmit the faulty page log, the instructions further cause the host processor to:
receive a log request for the faulty page log from a guest host processor configured to access the expandable memory pool; and
transmit the faulty page log to the guest host processor in response to the log request,
wherein the guest host processor is configured to set the second state of the one or more faulty pages of the expandable memory pool according to the faulty page log.

7. The system of claim 1, wherein the instructions further cause the host processor to:
receive an update from a first guest host processor that detects an error in a second memory device from among the expandable memory pool;
identify a faulty page of the second memory device according to the update;
update the faulty page log; and
set the second state of the faulty page of the second memory device based on the updated faulty page log.

8. The system of claim 7, wherein to transmit the faulty page log, the instructions further cause the host processor to broadcast the updated faulty page log to a second guest host processor configured to access the expandable memory pool.

9. The system of claim 1, wherein the error is a multi-bit error in the target page of the first memory device of the expandable memory pool, and the faulty page information comprises physical device information of the target page of the first memory device.

10. A method of handling faulty pages, comprising:
detecting, by a kernel of a first host device, an error in a target page of a first memory device of an expandable memory pool;
generating, by the kernel, an interrupt in response to detecting the error;
storing, by a device driver corresponding to the first memory device, faulty page information corresponding to the target page of the first memory device in a faulty page log; and
changing, by a faulty page log (FPL) daemon, a status of the target page of the first memory device from a first state to a second state according to the faulty page log.

11. The method of claim 10, wherein the first memory device of the expandable memory pool is connected to the first host device via a periphery component interconnect express (PCIe) interface and a compute express link (CXL) interconnect.

12. The method of claim 10, wherein the expandable memory pool comprises at least two different types of compute express link (CXL) memory devices.

13. The method of claim 10, further comprising:
performing, by the kernel, a reboot;
reading, by the FPL daemon, the faulty page log to identify one or more faulty pages of the expandable memory pool; and
setting, by the FPL daemon, the second state of the one or more faulty pages according to the faulty page log.

14. The method of claim 10, further comprising:
receiving, by the FPL daemon of the first host device, a log request for the faulty page log from an FPL daemon of a second host device configured to access the expandable memory pool; and
transmitting, by the FPL daemon of the first host device, the faulty page log to the second host device in response to the log request,
wherein the FPL daemon of the second host device is configured to set the second state of one or more faulty pages of the expandable memory pool according to the faulty page log.

15. The method of claim 10, further comprising:
receiving, by the FPL daemon of the first host device, an update from an FPL daemon of a second host device in response to the second host device detecting an error in a second memory device from among the expandable memory pool;
identifying, by the FPL daemon of the first host device, a faulty page of the second memory device according to the update;
updating, by the FPL daemon of the first host device, the faulty page log; and
setting, by the FPL daemon of the first host device, the second state of the faulty page of the second memory device based on the updated faulty page log.

16. The method of claim 15, further comprising broadcasting, by the FPL daemon of the first host device, the updated faulty page log to a third host device configured to access the expandable memory pool.

17. The method of claim 10, wherein the error is a multi-bit error in the target page of the first memory device of the expandable memory pool, and the faulty page information comprises physical device information of the target page of the first memory device.

18. A host device, comprising:
a root complex connected to an expandable memory pool over a memory interface, and configured to parse a packet received from a first memory device of the expandable memory pool;
a kernel configured to detect an error bit corresponding to a faulty page of the first memory device from the parsed packet, and generate an interrupt in response to detecting the error bit;
a driver of the first memory device configured to store faulty page information corresponding to the faulty page of the first memory device in a faulty page log in response to the interrupt; and
a faulty page log (FPL) daemon configured to change a status of the faulty page from a first state to a second state based on the faulty page log.

19. The host device of claim 18, wherein the expandable memory pool comprises at least two different types of compute express link (CXL) memory devices.

20. The host device of claim 18, wherein, in response to a reboot, the FPL daemon is configured to read the faulty page log to identify one or more faulty pages of the expandable memory pool, and set the second state of the one or more faulty pages according to the faulty page log.

* * * * *

UNITED STATES PATENT AND TRADEMARK OFFICE
CERTIFICATE OF CORRECTION

| | | |
|---|---|---|
| PATENT NO. | : 12,019,503 B2 | Page 1 of 1 |
| APPLICATION NO. | : 17/845679 | |
| DATED | : June 25, 2024 | |
| INVENTOR(S) | : Jongmin Gim et al. | |

It is certified that error appears in the above-identified patent and that said Letters Patent is hereby corrected as shown below:

In the Claims

In Column 19, Line 55, in Claim 1, delete "loci" and insert -- log --.

Signed and Sealed this
Twenty-second Day of October, 2024

Katherine Kelly Vidal
*Director of the United States Patent and Trademark Office*